(12) United States Patent
Adams et al.

(10) Patent No.: US 9,489,675 B2
(45) Date of Patent: *Nov. 8, 2016

(54) DYNAMIC CARD VALIDATION USING RANDOMLY DETERMINED CELL IDENTIFIERS

(71) Applicant: Bank of America Corporation, Charlotte, NC (US)

(72) Inventors: Amanda J. Adams, Flint (GB); Lawrence R. LaBella, Bellmore, NY (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,236

(22) Filed: Dec. 14, 2015

(65) Prior Publication Data

US 2016/0098717 A1    Apr. 7, 2016

Related U.S. Application Data

(63) Continuation-in-part of application No. 14/327,766, filed on Jul. 10, 2014, now Pat. No. 9,245,268.

(51) Int. Cl.
*G06K 5/00* (2006.01)
*G06Q 20/40* (2012.01)
*G06Q 20/34* (2012.01)
*G06Q 20/38* (2012.01)

(52) U.S. Cl.
CPC ............ *G06Q 20/409* (2013.01); *G06Q 20/34* (2013.01); *G06Q 20/351* (2013.01); *G06Q 20/385* (2013.01)

(58) Field of Classification Search
CPC .......... G06K 5/00; G06K 19/00; G06K 7/08; G06K 9/06
USPC .......................... 235/380, 487, 451, 492, 493
See application file for complete search history.

(56) References Cited

U.S. PATENT DOCUMENTS

| | | | |
|---|---|---|---|
| 2004/0193882 A1* | 9/2004 | Singerle, Jr. .......... | H04L 9/3226 713/168 |
| 2006/0018467 A1* | 1/2006 | Steinmetz ............... | G06F 21/34 380/54 |
| 2011/0101109 A1 | 5/2011 | Bona et al. | |
| 2013/0086389 A1 | 4/2013 | Suwald | |

FOREIGN PATENT DOCUMENTS

JP        2004362329        12/2004

OTHER PUBLICATIONS

Adams et al., "Dynamic Card Validation Using User Requested Cell Identifiers," U.S. Appl. No. 14/967,947, filed Dec. 14, 2015.

(Continued)

*Primary Examiner* — Edwyn Labaze
(74) *Attorney, Agent, or Firm* — Michael A. Springs

(57) ABSTRACT

A card validation system receives a request to validate a card. The system receives a set of cell identifiers from a merchant, where the set of cell identifiers determined by the merchant. The system further receives a set of received cell values corresponding to the set of cell identifiers of a card validation matrix. The system determines a set of stored cell values corresponding to the set of cell identifiers of the card validation matrix. The system compares the set of received cell values to the set of stored cell values. Based at least in part upon the comparison, the system determines whether the card is validated.

16 Claims, 5 Drawing Sheets

(56) References Cited

OTHER PUBLICATIONS

Adams et al., "Dynamic Card Validation Using Periodically Communicated Cell Identifiers," U.S. Appl. No. 14/968,393, filed Dec. 14, 2015.

Adams, et al., Dynamic Card Validation, U.S. Appl. No. 14/327,766, filed Jul. 10, 2014.

Adams, et al., U.S. Appl. No. 14/327,766, Non-final Office Action issued by the U.S. Patent and Trademark Office, Notification Date: Jun. 4, 2015.

* cited by examiner

DYNAMIC CARD VALIDATION USING RANDOMLY DETERMINED CELL IDENTIFIERS

RELATED APPLICATIONS

This application is a Continuation-in-Part of U.S. patent application Ser. No. 14/327,766, titled "DYNAMIC CARD VALIDATION," filed Jul. 10, 2014.

TECHNICAL FIELD

This invention relates generally to authentication of transactions, and more specifically to dynamic card validation for card-not-present transactions.

BACKGROUND

Customers and users perform transactions with various merchants, such as using a credit or debit card. Before completing or finalizing a transaction, the issuer of the credit card or debit card verifies that the customer or user is in possession of the card being used to perform the transaction. Current validation techniques are limited.

SUMMARY OF EXAMPLE EMBODIMENTS

According to embodiments of the present disclosure, disadvantages associated with validating a transaction when the card is not physically available to the merchant may be reduced or eliminated.

A card validation system receives a request to validate a card. The system receives a set of cell identifiers from a merchant, where the set of cell identifiers determined by the merchant. The system further receives a set of received cell values corresponding to the set of cell identifiers of a card validation matrix. The system determines a set of stored cell values corresponding to the set of cell identifiers of the card validation matrix. The system compares the set of received cell values to the set of stored cell values. Based at least in part upon the comparison, the system determines whether the card is validated.

Certain embodiments of the present disclosure may provide one or more technical advantages. In some embodiments, a system for facilitating dynamic card validation is operable to receive varying cell values from a merchant conducting a card-not-present transaction with the user card owner. This reduces or eliminates the risk that a third party with access to a user's card number engages in fraud. In some embodiments, a system for facilitating card validation is operable to store seeds that may generate a validation matrix rather than store the validation matrix that contains more data. This technique conserves bandwidth and memory consumed by validating a user's card.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Embodiments of the present invention and its advantages are best understood by referring to FIGS. 1-5, like numerals being used for like and corresponding parts of the various drawings.

Banks, business enterprises, and other financial institutions that conduct transactions with a user may perform due diligence to validate a user's card during transactions when the user does not physically present the card to a third party when using it for a purchase ("card-not-present transactions"). Examples of card-not-present transactions may include, but are not limited to, making a purchase with an enterprise debit card over the phone, making a purchase with an enterprise credit card over the internet, or setting up an automatic bill pay with a debit or credit card. Typically, the information gathered to validate a card during a card-not-present transaction may be limited. The teachings of this disclosure recognize that it would be desirable to require dynamic card validation when a user performs a card-not-present transaction in order to mitigate the risk of credit card fraud.

Figure 1:
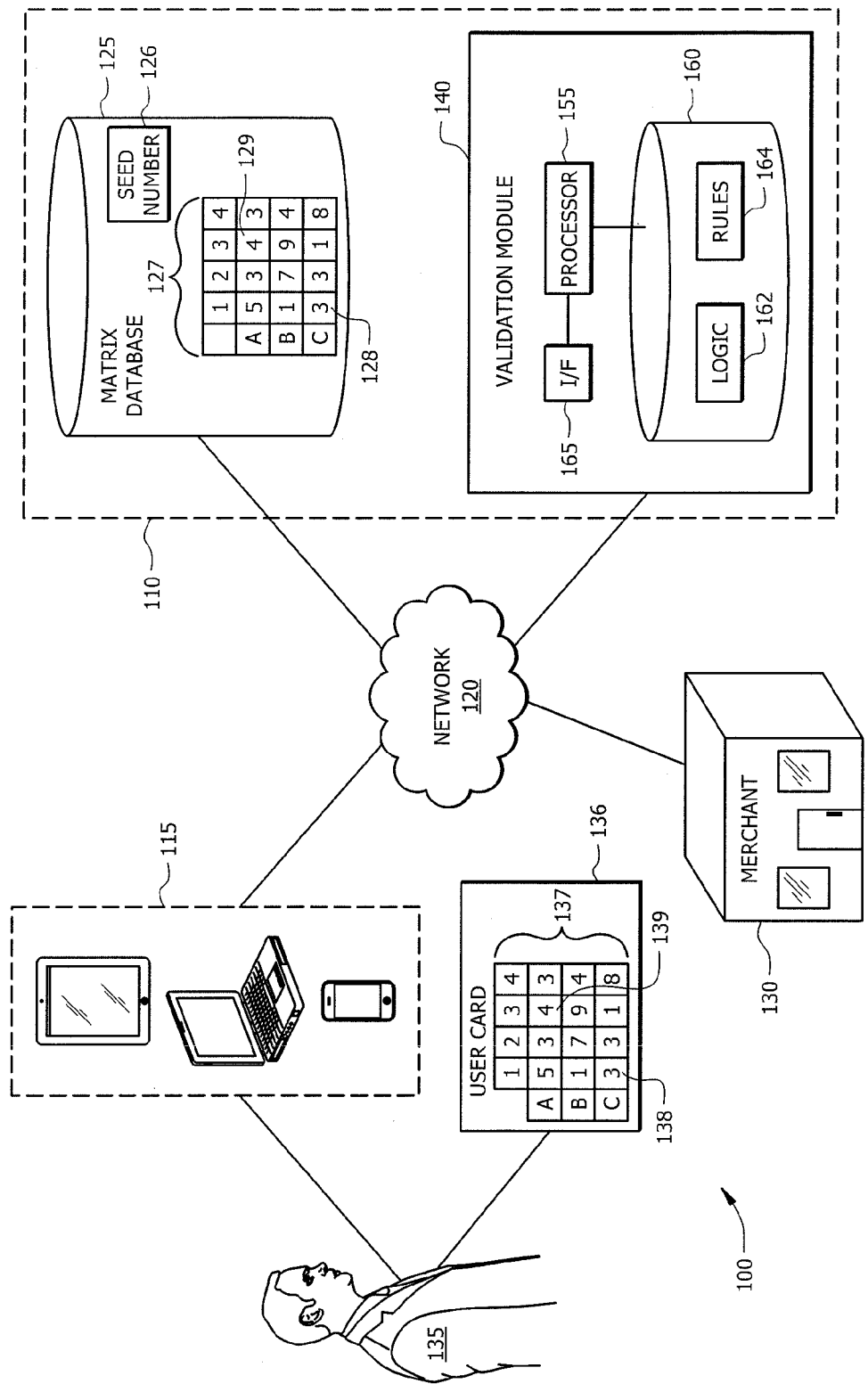
FIG. 1 illustrates an example system that facilitates dynamic card validation.

FIG. 1 illustrates an example system 100 that facilitates dynamic card validation. System 100 may include enterprise 110, one or more user devices 115, one or more merchants 130, one or more users 135, one or more user cards 136, one or more validation modules 140, and one or more matrix databases 125. Enterprise 110, user devices 115, and merchants 130 may be communicatively coupled by network 120. Enterprise 110 is generally operable to facilitate dynamic card validation, as described below.

In general, card validation system 100 receives a request to validate user card 136 and receives one or more received cell values corresponding to one or more cell identifiers of card validation matrix 137. System 100 determines one or more stored cell values corresponding to the one or more cell identifiers of stored validation matrix 127. System 100 compares the received cell values to the one or more stored cell values. Based at least in part upon the comparison, the system determines whether the card is validated.

User device 115 may refer to any device that facilitates user 135 conducting a transaction with enterprise 110 or merchant 130. In some embodiments, user device 115 may include a computer, workstation, telephone, Internet browser, electronic notebook, Personal Digital Assistant (PDA), pager, or any other suitable device (wireless, wireline, or otherwise), component, or element capable of receiving, processing, storing, and/or communicating information with other components of system 100. User device 115 may also comprise any suitable user interface such as a display, microphone, keyboard, or any other appropriate terminal equipment usable by user 135. It will be understood that system 100 may comprise any number and combination of user devices 115. User 135 utilizes user device 115 to interact with validation module 140, such as receiving cell identifiers determined and transmitted by validation module 140, as described below. In some embodiments, user 135 may be a customer of enterprise 110 who owns user card 136 attempting to conduct an activity with merchant 130, such as making a purchase with user card 136.

User card 136 may refer to any purchasing card, such as a credit card, that corresponds to an account of user 135 within enterprise 110. User card 136 may comprise card validation matrix 137 that facilitates dynamic card authentication. Card validation matrix 137 may be generated and printed on user card 136 when user card 136 is created or when it is issued to user 135. Card validation matrix 137 may be identical to stored validation matrix 127 to facilitate validating user card 136. In some embodiments, card validation matrix 137 comprises one or more cells 138 and 139 that are identified by a more cell identifier (e.g., A1-C4). For example, cell 138 corresponds to cell identifier C1, which includes row title (C) and column title (1) of cell 138. As another example, cell 139 corresponds to cell identifier A3. Cells 138 and 139 may comprise cell values; for example, cell 138 has a cell value of 3 and cell 139 has a cell value of 4. In some embodiments, three cell values may be bolded to indicate that those values are the default values for user 135 to communicate to merchant 130 when validating user card 136. Although card validation matrix 137 is illustrated with twelve cells and cell identifiers A1-C4, card validation matrix 137 may have any number of cells, cell identifiers, rows, and columns.

Network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

One or more merchants 130 may refer to any channel or entity that is not associated with and is remote to enterprise 110. Merchant 130 is typically associated with a third-party that provides a service or a product to user 135. For example, merchant 130 may be a business, retailer, company, or charity. In some embodiments, merchant 130 may accept payment or receive card information from user 135 in a card-not-present transaction. For example, merchant 130 may have a web service that accepts payment or credit card information through the internet or a web service. As another example, merchant 130 may have merchant employees receive payment or card information over the telephone when the employee may not be able to see or verify that user 135 possesses user card 136.

Enterprise 110 may refer to a financial institution, such as a bank, and may include one or more validation modules 140 and one or more matrix databases 125. Matrix database 125 may refer to any suitable device capable of storing information associated with matrices of user card 136. In certain embodiments, matrix database 125 may store one or more stored validation matrices 127. Stored validation matrix 127 may be identical to card validation matrix 137 printed on user card 136. Stored validation matrix 127 may comprise cells 128 and 129 corresponding to cell identifiers C1 and A3 and cell values 3 and 4, respectively. Although illustrated with twelve cells and cell identifiers A1-C4, stored validation matrix 127 may comprise any number of cells, cell identifiers, cell values, rows, and columns.

Matrix database 125 may also include information to correlate user card 136 with stored validation matrix 127. Therefore, validation module 140 may be able to access the correct stored validation matrix 127 to validate cell values received from merchant 130 when user 135 attempts to make a card-not-present purchase with user card 136. In some embodiments, matrix database 125 may store seed 126 corresponding to stored validation matrix 127. Validation module 140 may facilitate generating stored validation matrix 127 from seed 126 stored in matrix database 125. By storing seed 126 rather than the complete stored validation matrix 127 in matrix database 125, system 100 may conserve the bandwidth and memory consumed by validating user card 136.

Validation module 140 may refer to any suitable combination of hardware and/or software implemented in one or more modules to process data and provide the described functions and operations. In some embodiments, the functions and operations described herein may be performed by a pool of validation modules 140. In some embodiments, validation module 140 may include, for example, a mainframe, server, host computer, workstation, web server, file server, a personal computer such as a laptop, or any other suitable device operable to process data. In some embodiments, validation module 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems.

In general, validation module 140 receives a request to validate user card 136 and receives cell values corresponding to cell identifiers of card validation matrix 137. Validation module 140 determines the stored cell values of stored validation matrix 127 corresponding to the cell identifiers. Validation module 140 may compare the received cell values to the stored cell values and based on this comparison, determine whether user card 136 is validated. In some embodiments, validation module 140 may include processor 155, memory 160, and interface 165.

Memory 160 may refer to any suitable device capable of storing and facilitating retrieval of data and/or instructions. Examples of memory 160 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Although FIG. 1 illustrates memory 160 as internal to validation module 140, it should be understood that memory 160 may be internal or external to validation module 140, depending on particular implementations. Also, memory 160 may be separate from or integral to other memory devices to achieve any suitable arrangement of memory devices for use in system 100.

Memory 160 is generally operable to store logic 162 and rules 164. Logic 162 generally refers to algorithms, code, tables, and/or other suitable instructions for performing the described functions and operations. Rules 164 generally refer to policies or directions for determining the stored cell values corresponding to the cell identifiers and whether to validate the card. Rules 164 may be predetermined or predefined, but may also be updated or amended based on the needs of enterprise 110.

Memory 160 communicatively couples to processor 155. Processor 155 is generally operable to execute logic 162 stored in memory 160 to determine whether user card 136 is validated according to the disclosure. Processor 155 may comprise any suitable combination of hardware and software implemented in one or more modules to execute instructions and manipulate data to perform the described functions for validation module 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for validation module 140, send output from validation module 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system that allows validation module 140 to communicate to other devices. Communication interface 165 may include any suitable software operable to access data from various devices such as user devices 115, merchant 130, and matrix database 125. Communication interface 165 may also include any suitable software operable to transmit data to various devices such as user devices 115 and merchants 130. Communication interface 165 may include one or more ports, conversion software, or both. In general, communication interface 165 may receive a request to validate user card 136, receive one or more received cell values and cell identifiers, and transmit one or more cell identifiers to user 135.

In operation, logic 162 and rules 164, upon execution by processor 155, facilitate receiving cell values, comparing the received cell values to the stored cell values, and based at least in part upon the comparison, determining whether the card is validated.

In some embodiments, validation module 140 receives a request to validate user card 136 and receives received cell values corresponding to cell identifiers of card validation matrix 137. Validation module 140 may receive the request from merchant 130 via network 120. Merchant 130 may send the cell values to validation module 140 after receiving the cell values from user 135. For example, user 135 may utilize user device 115 to purchase an item from merchant 130 (e.g., through the website of merchant 130) and may provide one or more cell values from card validation matrix 137 in order to validate user card 136 such that the transaction may be confirmed. Merchant 130 may then send the cell values and a request to validate to validation module 140. By requiring various cell values to validate card-not-present transactions, system 100 may reduce or eliminate the risk of fraud. For example, if the card number of user card 136 is discovered by a third party, the third party would not be able to use the card number for a transaction with merchant 130 because the third party would not have access to user card 136 with card validation matrix 137.

In some embodiments, validation module 140 determines one or more stored cell values corresponding to the one or more cell identifiers of stored validation matrix 127. Validation module 140 may determine the stored cell values from stored validation matrix 127. For example, validation module 140 determines that cell 128 corresponds to cell identifier C1 and contains cell value 3. As another example, validation module 140 determines that cell 129 corresponds to cell identifier A3 and contains cell value 4.

In some embodiments, validation module 140 compares the received cell values to the stored cell values. Validation module 140 may determine whether the received cell values and the stored cell values are identical. For example, validation module determines that received cell values 3 and 4 (corresponding to cell identifiers C1 and A3 of card validation matrix 137, respectively) are an identical match to stored cell values 3 and 4 (corresponding to cell identifiers C1 and A3 of stored validation matrix 127, respectively). Based on this comparison, validation module 140 may determine whether user card 136 is validated. For example, if the received cell values and the stored cell values are an identical match, validation module 140 may determine that user card 136 is validated. As another example, if only one of the received cell values matches the stored cell values, then validation module 140 may determine that the card is not validated. For example, if the card number of user card 136 is discovered by a third party, the third party would not be able to use the card number for a transaction with merchant 130 because the third party would not possess the card with card validation matrix 137. By requiring the cell values to match, system 100 requires the person transacting with merchant 130 to be in physical possession of the card (i.e., not a third party that only knows the number of user card 136) so that the person may look at card validation matrix 137 to determine the correct cell values. Further, by requiring user 135 to provide multiple cell values, system 100 lessens the likelihood that a third party not in possession of user card 136 may simply guess the cell value numbers when attempting to validate user card 136.

In some embodiments, validation module 140 determines one or more cell identifiers to associate with user 135 and transmits the cell identifiers to user 135. Validation module 140 may transmit the cell identifiers to user device 115 via network 120. For example, validation module 140 may determine user card 136 may be validated by providing cell values corresponding to cell identifiers B1, A4, and C3. Continuing the example, validation module 140 may transmit those cell identifiers B1, A4, and C3 to user device 115 so that user 135 knows to provide the cell values 1, 3, and 1 to merchant 130. In some embodiments, validation module 140 may determine and transmit cell identifiers to user 135 on a regular basis (e.g., weekly, daily, or month) for user 135 to provide to merchant 130 when conducting transactions. In certain embodiments, validation module 140 may determine and transmit cell identifiers in response to user 135 sending a request for cell identifiers utilizing user device 115 to validation module 140 via network 140. For example, user device 115 may communicate the request for cell identifiers when user 135 is at a point of sale at merchant 130.

In some embodiments, validation module 140 receives the cell identifiers and the corresponding cell values. Validation module 140 may receive the cell identifiers and cell values from merchant 130 via network 120. For example, merchant 130 may inform user 135 to transmit the cell values corresponding to cell identifiers A2, B3, and C4. Continuing the example, user 135 utilizing user device 115 may provide cell values 3, 9, and 8 to merchant 130 and merchant 130 may transmit cell identifiers A2, B3, and C4 with cell values 3, 9, and 8 to validation module 140. As another example, user 135 may choose which cell identifiers to use for validation and may transmit both cell identifiers and corresponding cell values to merchant 130, which may transmit the information to validation module 140 to validate user card 136.

In some embodiments, validation module 140 accesses stored validation matrix 127 stored in matrix database 125 in order to determine the cell values corresponding to the cell identifiers of stored validation matrix 127. Matrix database 125 may store the entire stored validation matrix 127 and validation module 140 may retrieve stored validation matrix 127 and determine the cell values. In certain embodiments, validation module 140 stores seed 126 corresponding to stored validation matrix 127 in matrix database 125 and generates stored validation matrix 127 from seed 126 in order to determine the cell values corresponding to the cell identifiers. For example, validation module 140 may access seed 126 in matrix database 125 and use seed 126 to generate stored validation matrix 127. By storing seed 126 and generating stored validation matrix 127 each time it needs to be accessed, system 100 may reduce the memory required in system 100 because seed 126 comprises less data than stored validation matrix 127 itself.

In an exemplary embodiment of operation, user 135 utilizes user device 115 to request to perform an transaction (e.g., conduct a purchase) with merchant 130 using user card 136. Merchant 130 may request user 135 to provide cell values (e.g., 3 and 4) corresponding to cell identifiers (e.g., C1 and A3). Merchant 130 then sends a request to validate user card 136 to validation module 140. Validation module 140 receives the request to validate user card 136 and receives the cell values corresponding to cell identifiers of card validation matrix 137. Validation module 140 may determine stored cell values corresponding to cell identifiers of card validation matrix 137. For example, validation module 140 may access matrix database 125 and retrieve stored validation matrix 127 corresponding to user card 136 and may determine the cell values (e.g., 3 and 4) corresponding to cell identifiers (e.g., C1 and A3) of validation matrix 127. Validation module 140 compares the received cell values to the stored cell values and, based on the comparison, determines whether user card 136 is validated.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of users 135, user devices 115, user cards 136, merchants 130, matrix databases 125, validation modules 140, and enterprises 110. As another example, stored validation matrix 127, and/or its corresponding seed 126, may be stored in matrix database 125 or memory 160 of validation module 140. As another example, particular functions, such as generating stored validation matrix 127, may be performed by a separate component (e.g., matrix database 125) and validation module 140 may receive stored validation matrix 127. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set.

Figure 2:
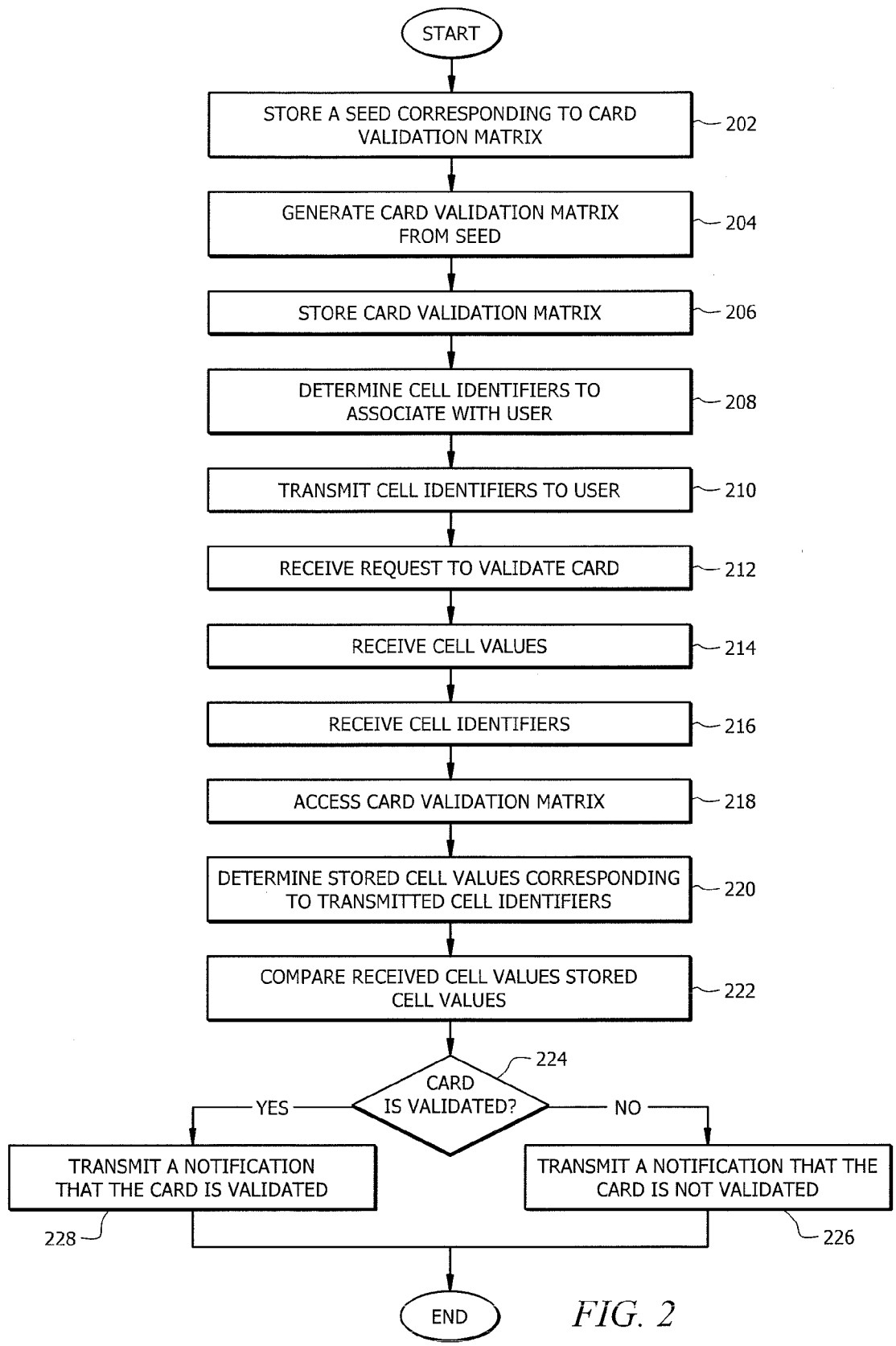
FIG. 2 illustrates an example flowchart for facilitating dynamic card validation.

FIG. 2 illustrates an example flowchart for facilitating dynamic card validation. At step 202, in some embodiments, validation module 140 may store seed 126 corresponding to stored validation matrix 127. Validation module 140 may store seed 126 in matrix database 125 or memory 160 of validation module 140. In some embodiments, seed 126 may be a random or pseudo-random number that, when accessed by validation module 140, facilitates generating the corresponding stored validation matrix 127. Validation module 140 may store seed 126 when user card 136 is issued or created, when seed 126 is first created, or at any time while user 135 utilizes user card 136.

At step 204, in some embodiments, validation module 140 generates stored validation matrix 127 from seed 126. In some embodiments, validation module 140 may generate stored validation matrix 127 from seed 126 at the time seed 126 is created. For example, validation module 140 may generate stored validation matrix 127 and at the time of its initial generation, may store matrix 127 at step 206 for validation module 140 to later access at step 218. Validation module 140 may also generate stored validation matrix 127 after a request is received to validate user card 136 at step 212. For example, matrix database 125 may store a plurality of seeds corresponding to a plurality of stored validation matrices 127 rather than storing matrices 127 themselves. Because seed 126 may comprise less data than stored validation matrix 127, enterprise 110 may save memory or space by storing a plurality of seeds 126 and generating stored validation matrix 127 each time it is needed, rather than storing a plurality of stored validation matrices 127 themselves.

At step 206, in some embodiments, validation module 140 stores validation matrix 127. Validation module 140 may store validation matrix 127 in matrix database 125 or in memory 160 of validation module 140. Validation module 140 may store validation matrix 127 when seed 126 is created, when user card 126 is issued, when stored validation matrix is generated using seed 126 at step 204, or at any other point while user 135 utilizes user card 126. In some embodiments, validation module 140 may store stored validation matrix 127 itself, rather than storing seed 126 at step 202 and generating stored validation matrix 127 at step 204 each time matrix 127 is needed. For example, validation module 140 may store validation matrix 127 when user card 126 is created and keep it stored for the duration of the time user 135 owns user card 136. By storing stored validation matrix 127, validation module 140 may save processing resources of system 100 because validation module 140 would not have to generate stored validation matrix 127 each time a request is made to validate user card 136.

At step 208, in some embodiments, validation module 140 determines one or more cell identifiers to associate with user 135. Validation module 140 may determine any cell identifiers from stored validation matrix 127 to associate with user 135 and user card 136. For example, validation module 140 may determine cell identifiers A1, B2, and C3 to associate with user 135 and user card 136. Validation module 140 may determine any number of cell identifiers to associate with user 135 and user card 136. For example, validation module 140 may determine four distinct cell identifiers (e.g., B3, C2, D1, A2), four cell identifiers with at least one repeated (e.g., A1, B2, A1, A2), or only one cell identifier (e.g., B4). In some embodiments, determining cell identifiers and associating the determined cell identifiers with user 135 and user card 136 requires the cell values corresponding to these cell identifiers to be received by enterprise 110 from merchant 130 in order to validate user card 136, for example at step 214.

At step 210, in some embodiments, validation module 140 may transmit the one or more determined cell identifiers to user 135 at user device 115 via network 120. Validation module 140 may send these determined cell identifiers using interface 165. In some embodiments, user 135 receives the determined cell identifiers and is notified to use these cell identifiers when validating user card 136 in a transaction with merchant 130. For example, validation module 140 may send a message to user device 115 that informs user 135 to provide the cell values corresponding to cell identifiers A3, C1, and D2 when using user card 136 to make a purchase from merchant 130. In some embodiments, validation module 140 may perform step 208 and/or step 210 after validation module 140 receives a request to validate a card in step 212. For example, validation module 140 may receive the request to validate user card 136, which may then prompt validation module 140 to transmit cell identifiers A2, B4, A1 to user device 115 and inform user 135 to provide the corresponding cell values to merchant 130. In some embodiments, validation module 140 may transmit the determined cell identifiers in response to a request from user 135. For example, user 135 may use enterprise application on user device 115 to submit a request to enterprise 110 to send cell identifiers for user card 136 validation. By determining the cell identifiers for user 135 to provide, validation module 140 may reduce or eliminate the risk of fraud. Even if a third party had the card number of user card 136 and some cell values used to validate user card 136 in a previous transaction, the third party would not know which cell identifiers to use to validate future transactions because validation module 140 only transmits the cell identifiers to user 135, not the third party.

In some embodiments, validation module 140 may determine cell identifiers at step 208 and transmit these cell identifiers 210 on a regular basis (e.g., weekly, daily or monthly) to notify user 135 to use these cell identifiers to validate user card 136 in any transaction with merchant 130. In some embodiments, the transmitted cell identifiers may expire after a period of time. For example, the transmitted cell identifiers may only be used to validate user card 136 for a transaction within the next hour, day, week, or month. In some embodiments, the transmitted cell identifiers expire after a predetermined number of uses. For example, user 135 may only use transmitted cell identifiers to validate user card 136 for a total of 3 transactions with merchant 130. Once the cell identifiers have been used the predetermined number of times, user 135 may request additional cell identifiers or validation module 140 may automatically determine and transmit additional cell identifiers.

In some embodiments, steps 208 and 210 may be omitted because merchant 130 may provide the corresponding cell identifiers to validation module 140 when providing the cell values. For example, at step 216, validation module 140 may receive one or more corresponding cell identifiers of card validation matrix 137. Merchant 130 may request certain predetermined cell identifiers from user 135 and transmit both the cell identifiers and the corresponding cell values to validation module 140. This would allow validation module 140 to omit steps 208 and 210 when validating user card 136.

At step 212, in some embodiments, validation module may receive a request to validate user card 136. Validation module 140 may receive this request at interface 165 from merchant 130 via network 120. At step 214, in some embodiments, validation module 140 receives one or more cell values corresponding to the one or more cell identifiers of card validation matrix 137. Validation module 140 may receive these cell values from merchant 130 via network 120 at interface 165. For example, user 135 may send to merchant 130 cell values 5, 7, and 1, which correspond to cell identifiers A1, B2, and C3, in order to validate user card 136. Merchant 130 may then transmit those cell values to validation module 140 in order to validate user card 136.

At step 216, in some embodiments, validation module 140 may receive one or more corresponding cell identifiers of card validation matrix 137. Validation module 140 may receive the cell identifiers from merchant 130 via network 120 at interface 165. In some embodiments, merchant 130 may request certain cell identifiers from user 135. For example, merchant 130 may request that user 135 provide cell values corresponding to cell identifiers A4, B3 and C2. Once received, merchant 130 may transmit both the cell identifiers A4, B3 and C2 along with the user-provided cell values 3, 9, and 3 to validation module 140 to validate user card 136.

In some embodiments, step 216 may be omitted because validation module 140 may have already determined the cell identifiers to be used to validate user card 136. The cell identifiers to be used to validate user card 136 may be the cell identifiers determined at step 208 and transmitted to user 135 at step 210. For example, validation module 140 may determine and transmit cell identifiers A2, B2, and C3 of stored validation matrix 127 to user 135 in order to validate user card 136. Continuing the example, user 135 may provide to merchant 130 the corresponding cell values 5, 7, and 1 and merchant 130 may transmit the cell values to validation module 140. By not providing both the cell values and the corresponding cell identifiers to merchant 130, but rather providing only the cell values, any third party that accesses records of merchant 130 would not be able to determine which cell values corresponding to which cell identifiers. Therefore, this embodiment reduces the likelihood of a third party being able to successfully perform a transaction with user card 136 because, even after accessing the credit card records of user 130, the third party would not be able to provide the appropriate cell values to validate user card 136.

At step 218, in some embodiments, validation module 140 accesses stored validation matrix 127. Validation module 140 may access stored validation matrix 127 from matrix database 125 or memory 160. In certain embodiments, validation module 140 may access stored validation matrix directly because it is stored in its entirety in matrix database 125 or memory 160. In some embodiments, validation module 140 may access seed 126 corresponding to stored validation matrix 127 and then generate stored validation matrix 127, which can be performed using one or more techniques discussed above with respect to step 204.

At step 220, in some embodiments, validation module 140 may determine one or more stored cell values corresponding to one or more cell identifiers. The cell identifiers may be those that validation module 140 determined and transmitted in steps 208 and 210 or may be those that validation module 140 received at step 216 either from merchant 130. Validation module 140 may determine the stored cell values by identifying the cells in stored validation matrix 127 corresponding to the received or transmitted cell identifiers. For example, if the cell identifiers are C1 and A3, validation module 140 identifies cells 128 and 129 and determines the stored cell values corresponding to cell identifiers C1 and A3 are 3 and 4, respectively.

At step 222, in some embodiments, validation module 140 compares the cell values received at step 214 to the stored cell values determined at step 220. Validation module 140 may determine the received cell values and the stored cells values are an identical match, a partial match, or no match at all. For example, if validation module 140 receives cell values 5, 7 and 2 and compares it to stored cell values 5, 7 and 1, validation module 140 may determine that the received cell values and stored cell values are only a partial match. As another example, validation module 140 may compare received cell values 1, 3, and 9 corresponding to cell identifiers B1, C2 and B3 with cell values 1, 3, and 9 corresponding to cell identifiers B1, C2, and B3 of stored validation matrix 127. Continuing the example, validation module 140 determines that the received cell values and the stored cell values are an exact match.

At step 224, in some embodiments, validation module 140 determines whether user card 136 is validated based at least in part upon the comparison in step 222. Validation module 140 may require an exact match to determine user card 136 is validated. For example, if merchant 130 provides cell identifiers A1, B2, and C3 and cell values 5, 7, and 1, then validation module 140 may determine the card is validated because the provided cell identifiers and cell values are an identical match to cell values 5, 7, and 1 corresponding to cell identifiers A1, B2, and C3 from stored validation matrix 127. Validation module 140 may allow a partial match to determine that user card 136 is validated. For example, if validation module 140 transmitted cell identifiers B1, B2, C3, and C4 (corresponding to cell values 1, 7, 1, and 8) to user 135 at step 210 and received cell values are 2, 7, 1, and 8 at step 216, validation module 140 may determine user card 136 is validated even though the cell values only partially match. Rules 164 may determine what type of partial match is sufficient to result in validation of user card 136 (e.g., based on the number of cell values that do not match or based on the proportion of cell values that do not match). If validation module 140 determines at step 224 that user card 136 is validated, it continues to step 226. If at step 224 validation module 140 determines the card is not validated, the method continues to step 228.

At step 226, in some embodiments, validation module 140 transmits a notification that user card 136 is validated. Validation module 140 may transmit the notification through interface 165 to merchant 130 via network 120. Once merchant 130 receives the notification that user card 136 is validated, it may allow user 135 to complete and confirm the transaction with merchant 130. In some embodiments, validation module 140 may transmit the notification to user 135 at user device 115 from interface 165 via network 120. For example, user 135 may receive the notification at user device 115 and may forward the notification to merchant 130. After validation module 140 transmits the notification that the card is validated the method ends.

At step 228, in some embodiments, validation module 140 may transmit a notification that user card 136 is not validated if it determined at step 224 that user card 136 is not validated. Validation module 140 may transmit the notification from interface 165 to merchant 130 via network 120. If merchant 130 receives the notification that user card 136 is not validated, it may prompt user 135 to provide additional cell identifiers and/or additional cell values. In some embodiments, validation module 140 may only allow user 135 to submit a maximum number of additional attempts to validate user card 136. For example, if user 135 fails to provide correct cell identifiers and/or cell values that correspond with each other after three attempts, user card 136 may become invalid and validation module 140 may not validate any additional transactions with the card. This may further mitigate the risk of fraud by a third party. Merchant 130 may request user 135 to use a different user card 136 or may notify user 135 that the transaction may not be completed as requested. In some embodiments, validation module 140 may transmit the notification to user 135 at user device 115 from interface 165 via network 120. User 135 may then provide additional cell values and cell identifiers to merchant 130 with or without prompting from merchant 130. After validation module 140 transmits the notification either that the card is or is not validated, the method ends.

Modifications, additions, or omissions may be made to the methods described herein without departing from the scope of the invention. For example, the steps may be combined, modified, or deleted where appropriate, and additional steps may be added. For example, steps 226 and 228 may be omitted and rather than transmit a notification that user card 136 is validated, validation module 140 may only determine that user card 136 is validated at step 224, after which the method ends. Additionally, the steps may be performed in any suitable order without departing from the scope of the present disclosure. For example, transmitting cell identifiers to user 135 at step 210 may be performed after validation module 140 receives a request to validate user card 136 at step 212. While discussed as validation module 140 performing the steps, any suitable component of system 100 may perform one or more steps of the method.

Figure 3:
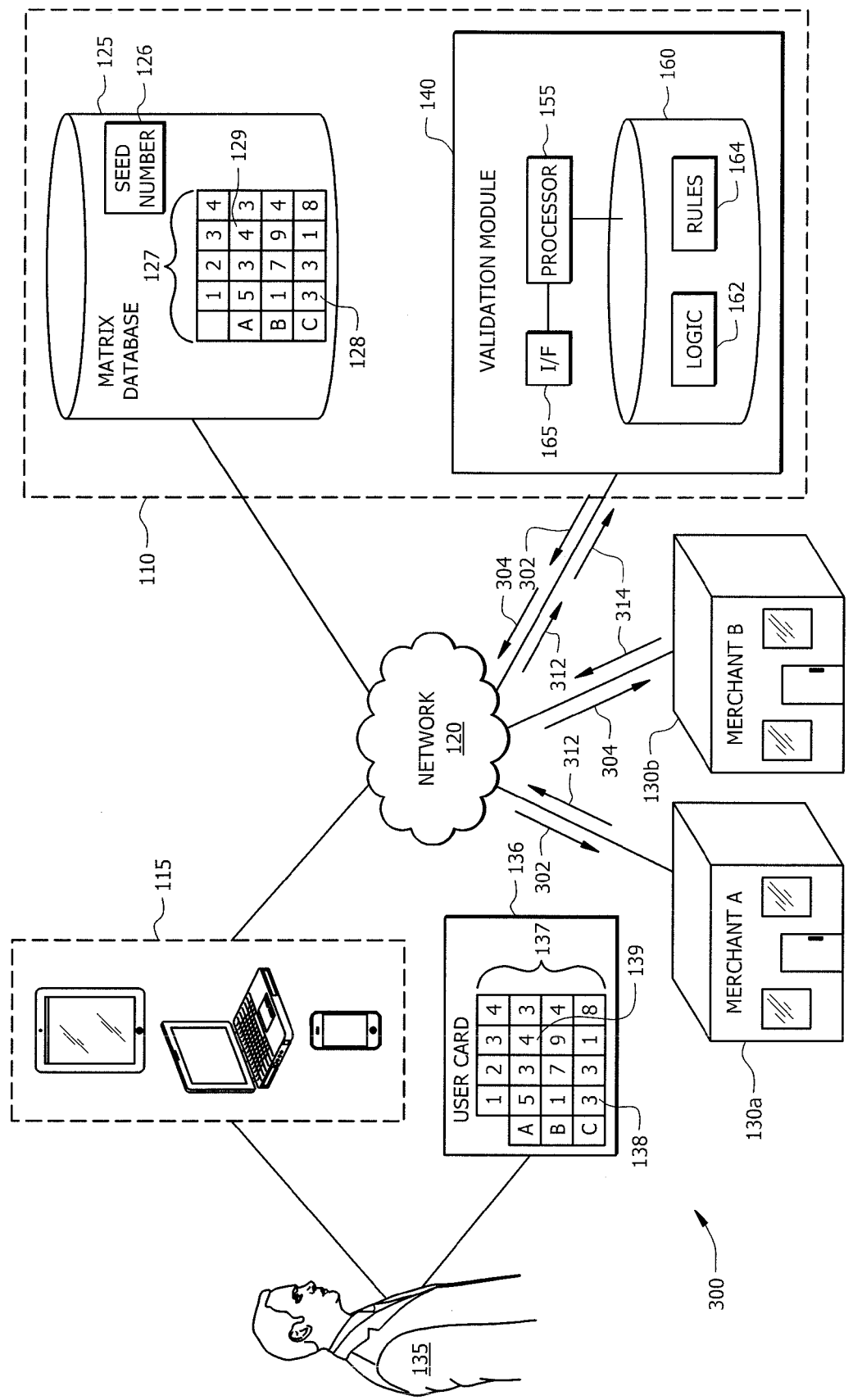
FIG. 3 illustrates an example card validation system that facilitates dynamic card validation using periodically communicated cell identifiers.

FIG. 3 illustrates card validation system 300, which is an embodiment of system 100 for facilitating dynamic card validation using periodically communicated cell identifiers. System 300 may include enterprise 110, one or more user devices 115, one or more merchants 130*a-b*, one or more users 135, one or more user cards 136, one or more validation modules 140, one or more matrix databases 125, and communications 302, 304, 312, and 314 between merchants 130*a-b* and validation module 140. Enterprise 110, user devices 115, and merchants 130 may be communicatively coupled by network 120. Enterprise 110 is generally operable to facilitate dynamic card validation, as described below.

In general, validation module 140 of card validation system 300 determines a set of cell identifiers of card validation matrix 137 to associate with one of merchants 130*a-b* and user 135. Validation module 140 transmits the set of cell identifiers to one of merchants 130*a-b*. Validation module 140 receives a set of received cell values corresponding to the set of cell identifiers and determines a set of stored cell values corresponding to the set of cell identifiers. Validation module 140 further compares the set of received cell values to the set of stored cell values and based at least in part upon the comparison, determines whether the card is validated.

In some embodiments, validation module 140 determines a set of cell identifiers to associate with one of merchants 130*a-b*. This set of cell identifiers is unique to each merchant, such that user 135 provides a different set of values when performing a transaction with merchant 130*a* versus performing a transaction with merchant 130*b*. For example, validation module 140 may associate cell identifiers A1, B2, C4 with merchant 130*a* (with corresponding cell values of 5, 7, and 8) and cell identifiers C1, B2, and A4 with merchant 130*b* (corresponding with cell values 3, 7, and 3). Continuing the example, if user 135 provides cell values 5, 7, and 8 when performing a transaction with merchant 130*a*, validation module 140 may determine that card 136 is validated. However, if user 135 provides cell values 5, 7, and 8 when performing a transaction with merchant 130*b*, validation module 140 may determine that card 136 is not validated.

Validation module 140 may determine the set of cell identifiers using a table of predetermined sets of cell identifiers (i.e., stored in memory 160), a random number generator (i.e., as indicated by rules 164), or any other suitable technique. In some embodiments, validation module 140 determines a new set of cell identifiers on a periodic basis, such as daily, weekly, monthly, or any varied period of time. This provides for additional security because the required values to make a purchase with one of merchants 130*a-b* are periodically changing. Thus, if a third party determines the cell values required to complete a transaction with merchant 130*a* at one point in time, the third party will not be able to use the same cell values once validation module 140 determines a new set of cell identifiers. This reduces or eliminates the risk that a third party with access to a user's card number engages in fraud.

In some embodiments, validation module 140 transmits the set of cell identifiers to merchants 130*a-b* as communications 302 and 304 via network 120. In some embodiments, validation module 140 transmits the same set of cell identifiers to merchants 130*a-b*. For example, any transaction with any merchant 130*a-b* requires the cell values corresponding to the same set of cell identifiers (A2, B4, C4). In other embodiments, validation module 140 transmits a unique set of cell identifiers to each merchant 130*a-b*. For example, validation module 140 may transmit cell identifiers A2, B2, C4 to merchant 130*a* and cell identifiers A1, B3, C2 to merchant 130*b*. Thus, in this embodiment, user 135 provides different cell values when transacting with merchant 130*a* than when performing a transaction with merchant 130*b*.

In some embodiments, validation module 140 may determine and transmit cell identifiers to merchants 130*a-b* on a regular basis (e.g., weekly, daily, or month) for merchants 130*a-b* to request from user 135 and provide to validation module 140 when conducting transactions. In some embodiments, validation module 140 may transmit a new set of cell identifiers to different merchants 130*a-b* on different time intervals. For example, merchant 130*a* may receive a new set of cell identifiers to use in transactions every Monday, while merchant 130*b* may receive a new set of cell identifiers every day.

In some embodiments, cell identifiers associated with one of merchants 130*a-b* may expire after a predetermined number of uses. Validation module 140 may determine that card 136 is not validated if it receives cell values corresponding to an expired set of cell identifiers. For example, the set of cell identifiers associated with merchant 130*b* may expire after ten uses. In response to the set of cell identifiers being used ten times, validation module 140 may transmit a new set of cell identifiers to merchant 130*b* for future transactions.

In some embodiments, validation module 140 determines an identity of one or merchants 130*a-b*. Validation module 140 may determine the identity in order to determine the cell identifiers currently associated with one of merchants 130*a-b*. Validation module 140, in some embodiments, receives a set of cell values from merchants 130*a-b* as communications 312 and 314, respectively, and determines a set of stored cell values corresponding to the set of cell identifiers for one or more merchants 130*a-b*. For example, validation module 140 may receive the cell values 1, 7, 9 from merchant 130*a*. Validation module 140 may determine that these cell values were received from merchant 130*a*, determine the cell identifiers currently associated with merchant 130*a* (i.e., B1, B2, and B3), determine the cell values corresponding to those current cell identifiers (i.e., 1, 7, and 9), and compare those stored cell values with the received cell values to determine that card 136 is validated. Having a unique set of cell identifiers for each merchant 130*a-b* periodically changed and transmitted to each merchant 130*a-b* reduces or eliminates the risk that a third party with access to a user's card number can make unauthorized transactions with the card.

Figure 4:
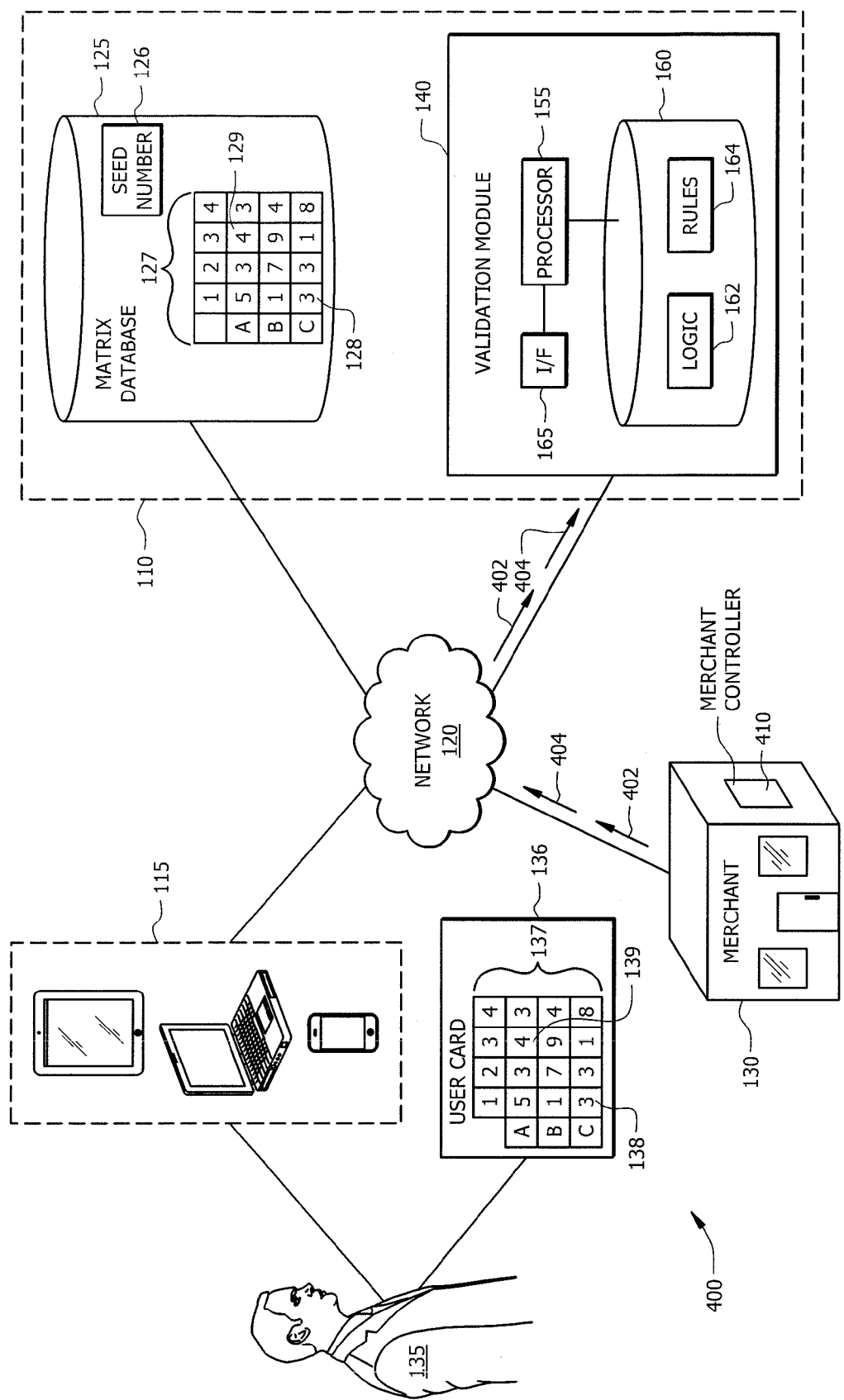
FIG. 4 illustrates an example card validation system, which is an embodiment of the system of FIG. 1, for facilitating dynamic card validation using randomly determined cell identifiers.

FIG. 4 illustrates card validation system 400, which is an embodiment of system 100 for facilitating dynamic card validation using randomly determined cell identifiers. System 400 may include enterprise 110, one or more user devices 115, one or more merchants 130, merchant controller 410, one or more users 135, one or more user cards 136, one or more validation modules 140, one or more matrix databases 125, and communications 402 and 404 between merchant 130 and validation module 140. Enterprise 110, user devices 115, and merchant 130 may be communicatively coupled by network 120. Enterprise 110 is generally operable to facilitate dynamic card validation, as described below.

In general, validation module 140 of card validation system 400 receives a request to validate card 136. Validation module 140 further receives a set of cell identifiers from merchant 130, where merchant 130 has determined the cell identifiers. Merchant 130 may determine the cell identifiers to use in a transaction using a table, schedule, generating random combinations, or any other suitable means. Validation module 140 receives a set of received cell values corresponding to the set of cell identifiers. Validation module 140 further determines a set of stored cell values corresponding to the set of cell identifiers, compares the set of received cell values to the set of stored cell values, and based at least in part upon the comparison, determines whether card 136 is validated.

In some embodiments, validation module 140 receives a set of cell identifiers of card validation matrix 127 or 137 from merchant 130. Validation module may receive the set of cell identifiers via network 120 and communication 402. In some embodiments, merchant 130 randomly determines the set of cell identifiers to use for a particular transaction. Merchant controller 410 may determine the set of cell identifiers to use. For example, merchant controller 410 may have a program that randomly selects a number of cell identifiers. In still another example, merchant controller 410 may use unique sets of cell identifiers for each of users 135. In some embodiments, merchant controller 410 determines the set of cell identifiers in response to user 135 initiating a card-not-present transaction. For example, user 135 may be on the website of merchant 130 attempting to buy a product. Continuing the example, merchant 130 may request cell identifiers A3, A4, and C1 when user 135 is using card 136 to pay for the product. User 135 may provide values of 4, 3, and 3 to validate the purchase. Merchant 130 may transmit cell identifiers A3, A4, and C1 along with values of 4, 3, and 3 to validation module 140 in order for card 136 to be validated, as explained below.

In some embodiments, validation module 140 receives a set of received cell values corresponding to the set of cell identifiers determined by merchant 130. Merchant 130 may transmit the set of received cell values via network 120 as communication 404. In some embodiments, merchant 130 transmits the cell identifiers (as communication 402) and received cell values (through communication 404) together in one simultaneous communication. In certain embodiments, merchant 130 transmits cell identifiers and received cell values separately, for example, in separate communications at slightly different points in time. By transmitting the information separately, it may reduce the likelihood that a third party may intercept the communication and then know the specific cell values that correspond to cell identifiers.

In some embodiments, the set of cell identifiers expire after a certain amount of time or a certain predetermined number of uses. Validation module 140 may keep track of the cell identifiers used by merchant 130 and reject the transaction if merchant 130 uses cell identifiers for too long of a period of time or for too many separate transactions. Validation module 140 may transmit an error message to merchant 130 indicating that merchant 130 must request different cell identifiers in order to validate the transaction. This provides oversight such that merchant 130 is required to mix up the cell identifiers it selects and ensure a more random selection. This randomization makes it more difficult for a third party to determine accurate cell values to perform unauthorized transactions with card 136.

Figure 5:
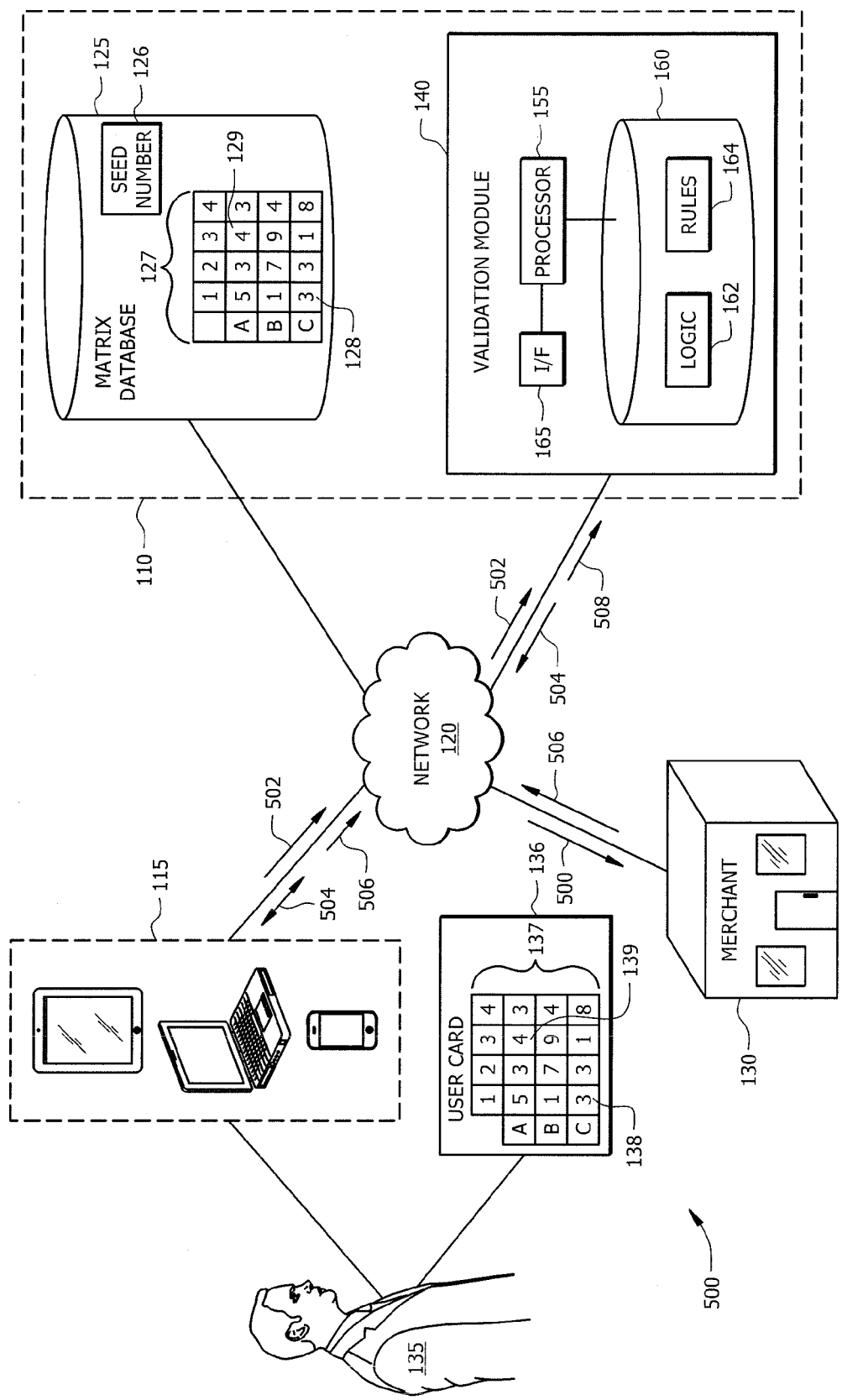
FIG. 5 illustrates an example card validation system, which is an embodiment of the system of FIG. 1, for facilitating dynamic card validation using user-requested cell identifiers.

FIG. 5 illustrates card validation system 500, which is an embodiment of system 100 for facilitating dynamic card validation using user-requested cell identifiers. System 500 may include enterprise 110, one or more user devices 115, one or more merchants 130, one or more users 135, one or more user cards 136, one or more validation modules 140, one or more matrix databases 125, communications 502 and 504 between user device 115 and validation module 140, and communications 506 and 508 between user device 115, merchant 130, and validation module 140. Enterprise 110, user devices 115, and merchants 130 may be communicatively coupled by network 120. Enterprise 110 is generally operable to facilitate dynamic card validation, as described below.

In general, validation module 140 of card validation system 500 receives a request to validate card 136 and receives request 502 from user device 115 for a set of cell identifiers. Validation module 140 determines a set of cell identifiers of card validation matrix 127 to associate with user 135 and card 136, and transmits the set of cell identifiers to user 135 in communication 504. These cell identifiers could be, for example, on a per transaction basis or set for a period of time (e.g., a day, a week, a month). After receiving the cell identifiers to be used, user 135 transmits a set of cell values corresponding to the set of cell identifiers in communication 506 to merchant 130. Merchant 130 transmits, and validation module 140 receives the set of cell values corresponding to the cell identifiers. Validation module 140 determines a set of stored cell values corresponding to the cell identifiers transmitted to user device 115. Validation module 140 compares the set of received cell values to the set of stored cell values. Based at least in part upon the comparison, validation module 140 determines whether the card is validated.

In some embodiments, validation module 140 receives a request for cell identifiers from user device 115. User 135 may be conducting a card-not-present transaction with merchant, and merchant 130 may have requested cell values to validate the transaction, thus prompting user 135 to request cell identifiers from validation module 140. User 135 may use user device 115 to request a set of cell identifiers from validation module 150 using a text message, a telephone call, an application of enterprise 110, or any other suitable means of communication with validation module 140. In some embodiments, validation module 140 may require the request to come from an authorized user device 115. For example, user 135 may register user devices 115 such as a phone, tablet, or computer that can send requests for cell identifiers. As another example, if user 135 utilizes a friend's phone to send a text message to request cell identifiers, validation module will recognize that it is not an authorized device and send an error message. This prevents a third party from requesting cell identifiers and reduces the likelihood of a third party using card 136 in unauthorized transactions. Thus, in order to perform an unauthorized transaction, a third party would need the physical card 136 as well as a registered user device 115 for user 135.

In some embodiments, validation module 140 determines a set of cell identifiers to associate with user 135. Validation module 140 may determine any cell identifiers from stored validation matrix 127 to associate with user 135. For example, validation module 140 may determine cell identifiers A1, B2, and C3 to be used to validation the card-not-present transaction. Validation module 140 may determine any number of cell identifiers to associate with user 135 and user card 136. For example, validation module 140 may determine four distinct cell identifiers (e.g., B3, C2, D1, A2), four cell identifiers with at least one repeated (e.g., A1, B2, A1, A2), or only one cell identifier (e.g., B4). In some embodiments, cell identifiers expire after a certain amount of time (e.g., one day, one week, one month) or a certain number of uses (e.g., one use, five uses, or 100 uses). For example, user 135 may request cell identifiers to use on a transaction-by-transaction basis. As another example, user 135 may request cell identifiers at the beginning of a week to use for the duration of that week.

In some embodiments, validation module 140 transmits the set of cell identifiers to user device 115. Validation module 140 may transmit the cell identifiers from interface 165 to user device 115 via network 120. Validation module 140 may transmit the cell identifiers using the same medium in which they were requested. For example, if user 135 requested cell identifiers by sending a text message, validation module 140 may transmit the cell identifiers to user device 115 by sending a text message. In some embodiments, validation module may transmit the cell identifiers using a different medium than they were requested. For example, if user device 115 uses an application of enterprise 110 to request the cell identifiers, validation module 140 may send the cell identifiers back by sending to the email address registered with the account of user 135.

In some embodiments, validation module 140 determines a set of stored values corresponding to the set of cell identifiers transmitted to user device 135. Validation module may access stored validation matrix 127 to determine the appropriate cell values. Then, when validation module 140 receives the cell values from merchant 130 (e.g., those that user 135 submitted to merchant 130), it can compare the stored cell values and the received cell values to determine if they match, and thus whether card 136 is validated. By requiring user 135 to request cell identifiers to use in a transaction, validation module 140 directly communicates with user 135 regarding security rather than communicating through merchant 130. Requiring use of a registered device creates additional barriers to third parties attempting to engage in fraud, thus reducing the likelihood that fraudulent transactions occur.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A card validation system, comprising:
an interface operable to:
receive a request to validate a card;
receive a set of cell identifiers from a merchant, the set of cell identifiers determined by the merchant;
receive a set of received cell values corresponding to the set of cell identifiers of the card validation matrix;
one or more processors communicatively coupled to the interface and operable to:
determine a set of stored cell values corresponding to the set of cell identifiers of the card validation matrix;
compare the set of received cell values to the set of stored cell values; and
based at least in part upon the comparison, determine whether the card is validated.

2. The system of claim 1, wherein the cell identifiers expire after a period of time.

3. The system of claim 1, wherein the cell identifiers expire after a predetermined number of uses.

4. The system of claim 1, further comprising:
a memory communicatively coupled to the one or more processors and operable to store a seed corresponding to the card validation matrix; and
the one or more processors further configured to generate the card validation matrix from the seed, wherein determining the one or more stored cell values comprises accessing the card validation matrix.

5. The system of claim 1, further comprising a memory communicatively coupled to the one or more processors and operable to store the card validation matrix, wherein determining the one or more stored cell values comprises accessing the card validation matrix.

6. The system of claim 1, wherein the card is remote to the card validation system and includes the card validation matrix.

7. A non-transitory computer-readable medium encoded with logic, the logic operable when executed to:
receive a request to validate a card;
receive a set of cell identifiers of a card validation matrix from a merchant, the set of cell identifiers determined by the merchant;
receive a set of received cell values corresponding to the set of cell identifiers of the card validation matrix;
determine a set of stored cell values corresponding to the set of cell identifiers of the card validation matrix;
compare the set of received cell values to the set of stored cell values; and
based at least in part upon the comparison, determine whether the card is validated.

8. The computer-readable medium of claim 7, wherein the set of cell identifiers expire after a period of time.

9. The computer-readable medium of claim 7, wherein the set of cell identifiers expire after a predetermined number of uses.

10. The computer-readable medium of claim 7, wherein the logic is further operable to:
store a seed corresponding to the card validation matrix; and
generate the card validation matrix from the seed, wherein determining the one or more stored cell values comprises accessing the card validation matrix.

11. The computer-readable medium of claim 7, wherein the logic is further operable to store the card validation matrix, wherein determining the one or more stored cell values comprises accessing the card validation matrix.

12. A card validation method, comprising:
receiving, at an interface, a request to validate a card;
receiving, at the interface, a set of cell identifiers from a merchant, the set of cell identifiers determined by the merchant;
receiving, at the interface, a set of received cell values corresponding to the set of cell identifiers of the card validation matrix;
determining, using the processor, a set of stored cell values corresponding to the set of cell identifiers of the card validation matrix;
comparing, using the processor, the set of received cell values to the set of stored cell values; and
based at least in part upon the comparison, determining, using the processor, whether the card is validated.

13. The method of claim 12, wherein the cell identifiers expire after a period of time.

14. The method of claim 12, wherein the cell identifiers expire after a predetermined number of uses.

15. The method of claim 12, further comprising:
storing, in a memory, a seed corresponding to the card validation matrix;
generating, using the processor, the card validation matrix from the seed; and
wherein determining the one or more stored cell values comprises accessing the card validation matrix.

16. The method of claim 12, further comprising storing, in a memory, the card validation matrix, wherein determining the one or more stored cell values comprises accessing the card validation matrix.

* * * * *